United States Patent [19]

Na

[11] Patent Number: 5,251,034
[45] Date of Patent: Oct. 5, 1993

[54] AUTOMATIC PIP CHANNEL SEARCHING APPARATUS AND METHOD

[75] Inventor: Un-heui Na, Seoul, Rep. of Korea

[73] Assignee: Samsung Electronics Co., Ltd., Rep. of Korea

[21] Appl. No.: 849,157

[22] Filed: Mar. 10, 1992

[30] Foreign Application Priority Data

Jul. 9, 1991 [KR] Rep. of Korea .................. 91-11621

[51] Int. Cl.⁵ .............................................. H04N 5/50
[52] U.S. Cl. ..................................... 358/183; 358/22; 358/191.1; 358/193.1
[58] Field of Search ............... 358/22 PIP, 183, 191.1, 358/193.1, 335

[56] References Cited

U.S. PATENT DOCUMENTS

| | | | |
|---|---|---|---|
| 5,045,946 | 9/1991 | Yu | 358/191.1 |
| 5,144,438 | 9/1992 | Kim | 358/193.1 X |
| 5,161,019 | 11/1992 | Emanuel | 358/191.1 X |

Primary Examiner—Victor R. Kostak
Attorney, Agent, or Firm—Sughrue, Mion, Zinn, Macpeak & Seas

[57] ABSTRACT

In a channel search mode of a video cassette recorder (VCR) having a picture-in-picture (PIP) function, an automatic PIP channel search apparatus and method used during television (TV) viewing which is composed of at least the steps of setting the currently-viewed broadcast picture in a main screen, if a scan key is input when watching a TV channel, setting broadcasting channels excluding the channel set as the main screen as subscreens and displaying in turn the subscreen channels, and if the scan key signal is input again, displaying only a specific channel broadcast on the main screen. An automatic PIP channel search apparatus and method used during viewing a video tape is composed of the steps of setting a reproduced signal of the currently-viewed video tape as a main screen if a scan key is input, when reproducing a video tape of the VCR, setting a plurality of stored broadcasting channels as subscreens and displaying in turn the subscreen channels, and if the scan key signal is input again, displaying only the video signal on the main screen. As a result of the method, one can easily find which program is broadcast on a different channel by displaying a broadcasting channel besides the currently-viewed channel on the monitor in the PIP screen, using the scan key.

7 Claims, 4 Drawing Sheets

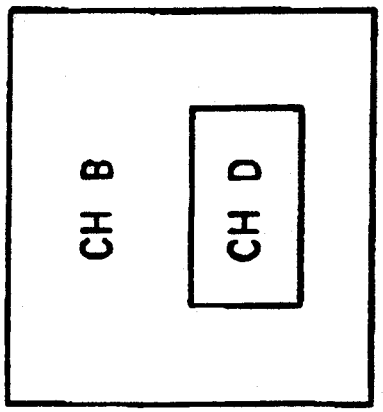
FIG.3.A
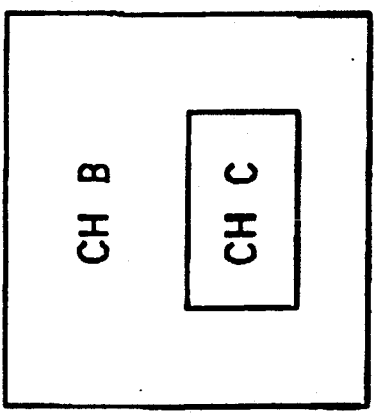
FIG.3.B
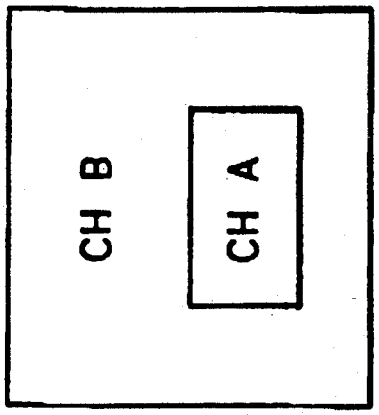
FIG.3.C

AUTOMATIC PIP CHANNEL SEARCHING APPARATUS AND METHOD

BACKGROUND OF THE INVENTION

The present invention relates to an automatic picture-in-picture (PIP) channel searching apparatus and method, and more particularly to an automatic PIP channel searching apparatus and method for selecting a desired broadcasting channel while watching different broadcasting channels in the PIP form while either reproducing (playing back) a cassette tape using a video cassette recorder (VCR), or while watching television (TV).

Generally, when selecting a different channel while watching TV, it is inconvenient for a user to manipulate a ten-key pad or a channel up/down key to select a desired channel. Further, when selecting a TV channel while reproducing a video cassette signal on a VCR, it is inconvenient to change the VCR mode to a TV mode, and then manipulate the channel up/down key or the ten-key pad so as to select a desired channel.

Therefore, a PIP function is proposed to solve the inconvenience. As a video signal processing method is digitized, the PIP function is capable of displaying a subpicture as a moving or still picture in a portion of the main picture. However, even when searching channels using such a PIP function, if channels are searched by dividing the whole screen into a plurality of subscreens and moving to the subscreens each time the user depresses the channel up/down key, the number of searchable channels is limited according to the number of the subscreens. Further, if the whole screen is divided into subscreens and all the stored channels are displayed on each subscreen to fill the whole screen, a next screen may be used but this has no connection to the currently-viewed picture in the channel search.

SUMMARY OF THE INVENTION

It is therefore an object of the present invention to provide an automatic PIP channel search apparatus and method for, when operating a scan key while the user is watching television (TV) or a video tape on a video cassette recorder (VCR) using a TV having a PIP function, searching channels by taking the currently-viewed picture as a main screen and taking the searched broadcasting channels as subscreens, to thereby facilitate the channel selection.

To accomplish the above and other objects, the automatic PIP channel search apparatus and method of the present invention involves the steps of setting the currently-viewed broadcast signal as a main screen, if a scan key is input when watching a TV channel, setting broadcasting channels excluding the channel set as the main screen, as subscreens, to display in turn the subscreen channels, and displaying only a specific channel broadcast on the main screen if the scan key signal is input again.

According to another embodiment of the present invention, the automatic PIP channel search apparatus and method, as used during viewing a video tape, involves the steps of setting a reproduced signal of currently-viewed video tape as the main screen if the scan key is input and when reproducing the video tape of the VCR, setting a plurality of stored broadcasting channels as subscreens, to display in turn the subscreen channels, and displaying only the video signal on the main screen if the scan key signal is re-input.

BRIEF DESCRIPTION OF THE DRAWINGS

The above objects and other advantages of the present invention will become more apparent from the following detailed description of a preferred embodiment of the present invention with reference to the attached drawings in which:

FIGS. 3A–3C show a main screen with a picture-in-picture subscreen.

DETAILED DESCRIPTION OF THE INVENTION

Figure 1:
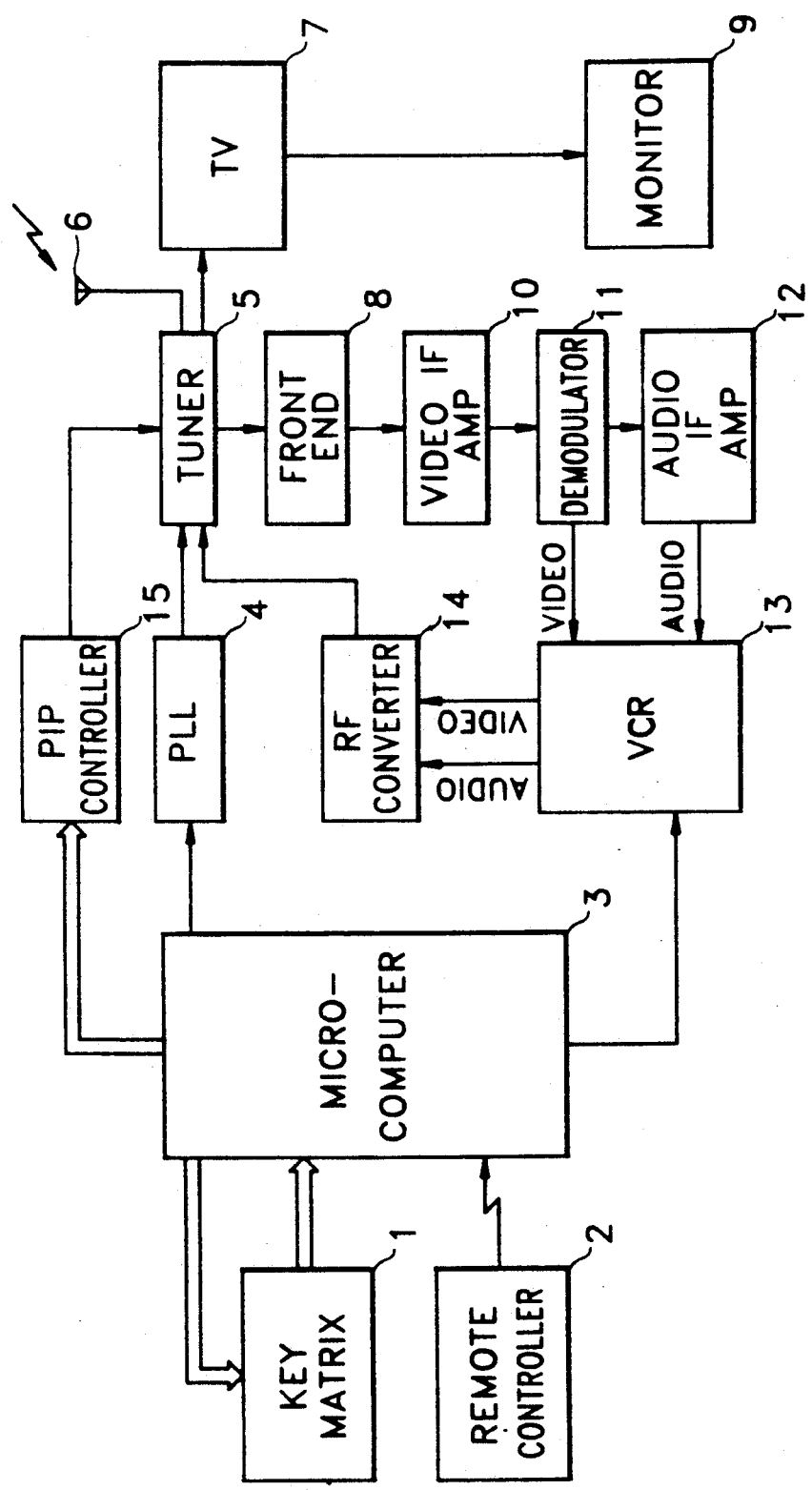
FIG. 1 is a block diagram of a video cassette recorder having an automatic PIP channel search function according to the present invention.

Referring to FIG. 1, a key input signal generated from a key matrix 1 or remote controller 2 is fed to a microcomputer 3, which then allows video signals from a television (TV) broadcast channel or a video cassette recorder (VCR) to be viewed.

For instance, if a user is watching the TV broadcast and presses a TV/VCR key (not shown) on key matrix 1 or remote controller 2, the microcomputer 3 controls a phase-lock loop 4 to generate a tuning voltage to a tuner 5. Tuner 5 then selects a broadcasting signal received from an antenna 6, amplifies the weak radio wave to be supplied to a TV 7 and a front end 8. TV 7 separately processes audio and video signals to be displayed on a monitor 9.

To select the radio wave of a desired channel, front end 8 mixes an input signal with a local oscillation signal and heterodyne-detects an RF signal to form a video IF signal. A video IF amplifier 10 amplifies the video IF signal to be sent to a demodulator 11. Demodulator 11 demodulates the video IF to form a video and an audio IF signal. An audio IF amplifier 12 then performs FM detection to obtain the audio signal.

Meanwhile, during the video cassette recorder mode, audio and video signals from a VCR 13 are sent to TV 7 via an RF converter 14. At this time, when the tuned channel is set to channel 3 or 4 and an RF signal is fed to TV 7, tuner 5 reconstructs the audio and video signals to be displayed on monitor 9.

Herein, a TV composed of an ordinary video cassette recorder has been described. The present invention uses a PIP controller 15 to select a different channel in a PIP screen while watching TV, or to select a TV channel in a PIP screen while reproducing a video signal from the VCR.

Figure 2A:
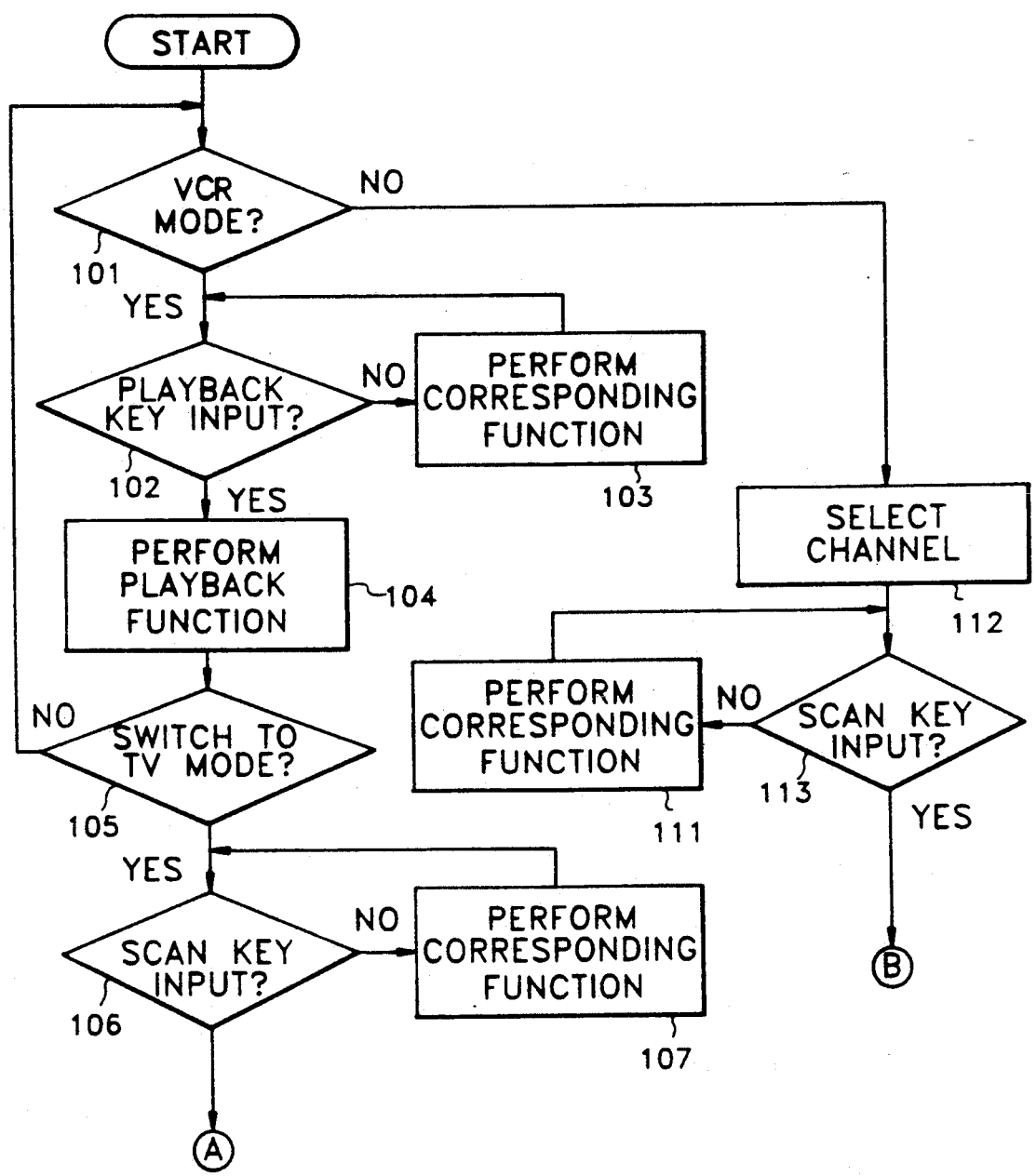
FIGS. 2A and 2B illustrate a procedure for automatically searching channels according to the present invention.
Figure 2B:
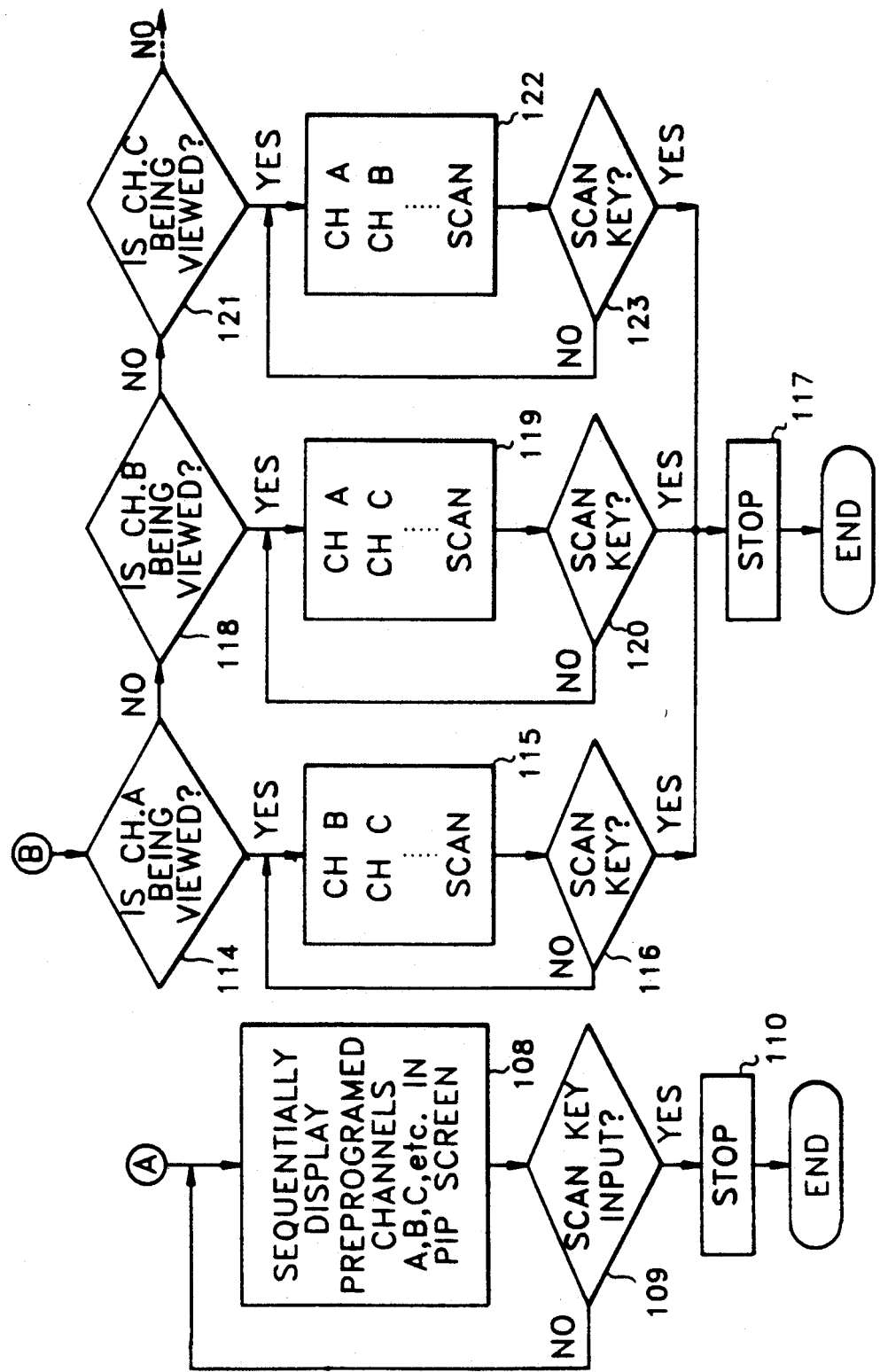

Now, a channel selection using the present invention will be described with reference to FIGS. 2A and 2B.

First, when power is on, microcomputer 3 decides whether the current mode is a TV mode or a VCR mode (step 101). If the present mode is the VCR mode (channel 3 or 4 is selected), the program proceeds from step 101 to step 102, where microcomputer 3 decides whether or not a playback key is input. If the playback key is not pressed, step 103 performs that function corresponding to the pressed key, but if the playback key is pressed, microcomputer 3 operates VCR 13 in a playback mode in step 104. Microcomputer 3 then determines whether or not the current mode (VCR mode) is changed to the TV mode (step 105), if the current mode is changed to the TV mode, the microcomputer 3 decides whether or not a scan key is input (step 106), but if it is still the VCR mode in step 105, the program returns to step 101. If the scan key is not pressed, step 107 performs the function corresponding to the other key that is pressed.

If the scan key is pressed in step 106, microcomputer 3 controls PIP controller 15 so that a reproduced signal from a video tape is displayed on the main screen and in step 108 preprogrammed broadcasting channels A, B, C, etc. are continuously displayed in turn for a predetermined time on a subscreen. Under the above condition, when the scan key is re-input in step 109, step 110 stops displaying the PIP picture. Thus, since the video-reproduced signal is redisplayed on the monitor, the user can easily find which program is currently broadcast on what channel.

Meanwhile, if the current mode is not the VCR mode in step 101, microcomputer 3 recognizes the mode to be the TV mode, and the program proceeds to step 112 and selects a channel. Afterwards, if the scan key is input, step 113 moves to step 114 to perform a channel search function, and if not, step 111 performs a function corresponding to the key pressed.

If the user is viewing channel A at the time when the scan key is pressed, microcomputer 3 displays channels B, C, etc. on monitor 9 in the PIP screen. Here, the main screen of the monitor is channel A and the subscreen is channels B, C, etc. which are continuously displayed in turn for a predetermined time in step 115. During the PIP screening process, if the scan key is pressed again, steps 116 and 117 stop the channel search performed by the PIP function.

Meanwhile, if in step 118, the currently-viewed channel is not channel A but channel B, then channels, A, C, and the remaining preprogrammed channels are likewise displayed in the PIP screen, excluding channel B (step 119). If the scan key is pressed again, steps 120 and 117 stop the channel search function. Similarly, according to his novel invention, if the currently-viewed channel is channel C or any other preprogrammed channel, the program returns to step 121 to display a corresponding broadcast in the PIP screen, thereby facilitating the channel search.

Referring to FIGS. 3A-3C, a main screen is shown with a picture-in-picture (PIP) subscreen, wherein the main channel is shown as channel B, and the remaining channels A, C and D are sequentially displayed on a subscreen.

As described above in detail, the automatic PIP channel search apparatus and method of the present invention can easily find which program is broadcast in a different channel by displaying broadcasting channels other than the currently-viewed channel on the monitor in the PIP screen, using the scan key.

While the invention has been particularly shown and described with reference to preferred embodiments thereof, it will be understood by those skilled in the art that various changes in form and detail may be made therein without departing from the spirit and scope of the invention as defined by the appended claims.

What is claimed is:

1. In a channel search method of a television (TV) having a picture-in-picture (PIP) function, an automatic PIP channel search method used during TV viewing, the method comprising the steps of:

setting the currently-viewed broadcast channel as a main screen, if a scan key is input when watching a TV channel;

setting each of a plurality of broadcasting channels, excluding said currently-viewed broadcast channel which is set as said main screen, for display as a subscreen with said main screen; and automatically displaying each of the channels set as said single subscreen, wherein said step of automatically displaying comprises the step of automatically sequentially displaying each of said broadcasting channels set for display as said single subscreen so that only a single channel is displayed as a subscreen with said main screen.

2. The method of claim 1, further comprising the step of stopping the automatic sequential display of said plurality of broadcasting channels as a single subscreen in response to another input of said scan key.

3. In a channel search method of a video cassette recorder (VCR) having a picture-in-picture (PIP) function, an automatic PIP channel search method used during viewing a video tape, the method comprising the steps of:

setting a reproduced signal of a currently-viewed video tape as a main screen if a scan key is input when reproducing a video tape in said VCR;

setting each of a plurality of stored broadcasting channels as a single subscreen;

automatically displaying each of said channels as said single subscreen, wherein said step of automatically displaying comprises the step of automatically sequentially displaying each of said broadcasting channels set for display as a single subscreen so that only a single channel is displayed with said main screen; and displaying only the video signal in said main screen if said scan key signal is input again.

4. A channel searching apparatus comprising:

main screen setting means for setting a currently-viewed video signal as a main screen signal for display as a main screen on a video screen;

subscreen setting means for setting subscreen signals for display on a portion of the video screen, said subscreen signals being superimposed on said main screen; and scanning means, responsive to a video signal scan command input from an external source, for setting and automatically displaying different subscreen signals individually displayed with said main screen based on video signals available for display except for the video signal set as the main screen signal, each of said different subscreen signals being displayed for a predetermined period of time as a single subscreen with said main screen.

5. The channel searching apparatus of claim 4, wherein the channel scan command is generated by a remote control transmitter for scanning through a plurality of broadcast television signals into the apparatus as video signals available for display.

6. The channel searching apparatus of claim 3, wherein the currently-viewed video signal is a video cassette tape signal output from a video cassette recorder during a reproducing process.

7. The apparatus of claim 4, further comprising stopping means for stopping the automatic sequential display of said different subscreen signals as a single subscreen in response to a video signal scan stop command.

* * * * *